United States Patent Office 2,935,136
Patented May 3, 1960

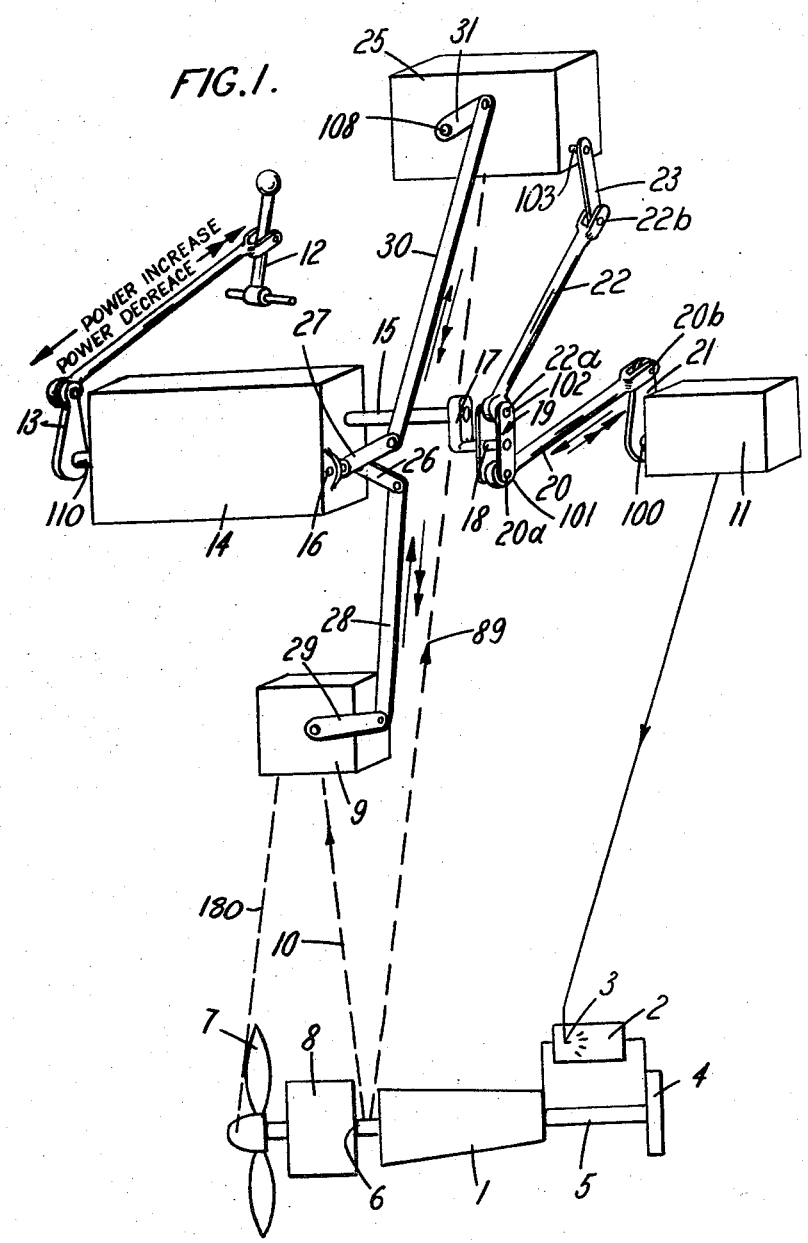

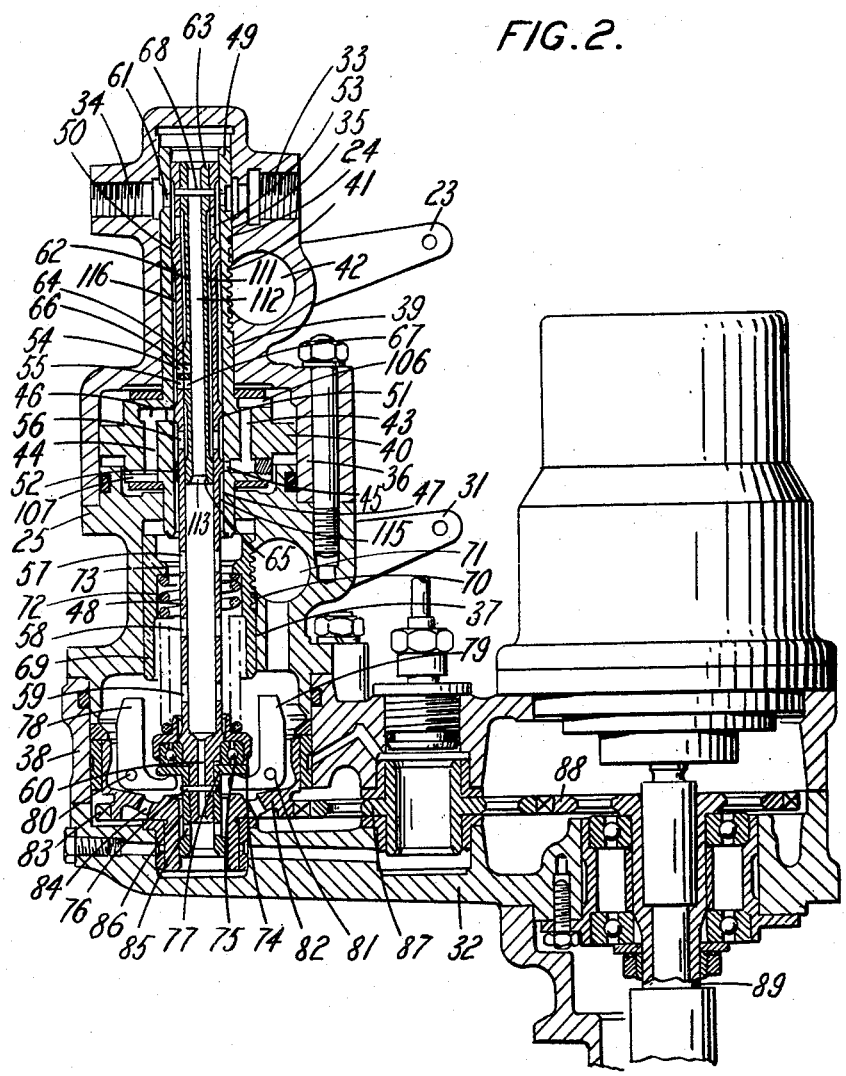

2,935,136

CONTROL SYSTEMS FOR POWER PLANTS

William Albert John Wall and Richard James Wall, Gloucester, England, assignors to Rotol Limited, Gloucester, England, a British company Application January 31, 1955, Serial No. 485,206

Claims priority, application Great Britain February 4, 1954

6 Claims. (Cl. 170—135.74)

This invention relates to a control system for a power plant comprising an internal combustion engine driving a variable pitch propeller, and concerns a control system of the kind (hereinafter referred to as the kind described) including a variable datum speed governor to control the speed of rotation of the propeller by varying the pitch thereof, and a fuel control to control the rate of flow of fuel to the internal combustion engine, the fuel control and a control for adjusting the datum of the governor being interconnected by a linkage so as to be normally operable together by a single master control which correlates fuel flow and propeller speed, and hence the power output of the engine and the engine speed.

Hitherto it has been found that with a control system of the kind described, especially when used for controlling a gas turbine driving a variable pitch propeller or airscrew, if the setting of the master control is changed with even normal rapidity, and especially if the change in setting is considerable, the time taken for the propeller pitch to reach its new value is longer than that required for the corresponding adjustment of the fuel flow. In consequence, the engine under speeds or overspeeds depending upon the sense in which the master control was adjusted and the governor controlling the propeller speed calls for an adjustment of the propeller pitch which is in addition to the adjustment which the governor has been called upon to effect by the change in the setting of the master control to correct the underspeeding or overspeeding. As a consequence overcorrection of the propeller pitch, and hunting, result before the pitch and speed finally settle down at the values required by the new setting of the master control.

As an example, consider a control system of the kind described in which the master control has a characteristic such that, when it is moved in one direction, it calls for an increased fuel flow but no change in speed of rotation. As the fuel flow increases, the propeller pitch coarsens to absorb the increased power but its rate of change does not keep pace with that of the fuel flow. There is therefore an increase in speed of rotation, which results in a further demand for coarsening of the pitch, and thus in its overadjustment and in its underspeeding. The pitch control then responds to reduce pitch and increase the speed. This to and fro adjustment will, of course, rapidly die down, depending on the sensitivity of the pitch change mechanism, but the initial over-correction and resulting surge of power thrust may be large. Such surging is undesirable, particularly on carrier-borne aircraft, where power surges on adjustment of the master control during landing may have disastrous results, leading to a baulked landing and loss of the aircraft.

Similarly, if the master control calls for a simultaneous change in fuel flow and speed of rotation, the rate of pitch change, whether it be increase or decrease, will lag behind the fuel flow adjustment, with consequent overcorrection of the pitch and surging until equilibrium is restored.

It is an object of the present invention to reduce this defect to a magnitude which will not be harmful.

To this end the present invention broadly provides a control system of the kind described comprising an auxiliary fuel governor interconnected with said control system in a manner such that so long as the engine speed is different from that selected by the master control, the auxiliary fuel governor adjusts the rate of flow of fuel to the engine relatively to that selected by the master control in a sense to reduce the said speed difference.

According to a feature of the present invention the auxiliary fuel governor may comprise a variable datum centrifugal governor responsive to the speed of the engine and which has its datum setting adjustable in unison with adjustment of the datum setting of a centrifugal speed governor so that when the engine speed corresponds to any particular speed selected by the master control, the two centrifugal governors are always in an equilibrium setting, an output member movable under the control of the centrifugal fuel governor, which output member is connected with one member of a differential device the other input member of which is connected to the master control and the output member of which is connected to the fuel control such that when the centrifugal fuel governor detects a difference between the engine speed and a speed selected by the master control it moves from its equilibrium setting and thereby causes movement of said output member which effects an adjustment of the fuel control relatively to that selected by the master control in the sense to adjust the speed of the engine to reduce said difference.

A specific embodiment of the invention will now be described, merely by way of example, with reference to the accompanying drawings as applied to the control of a gas turbine engine driving a variable pitch propeller.

In the drawings

Figure 1 is a perspective view showing diagrammatically, the layout of a complete control system in accordance with the present invention, and Figure 2 shows, in elevational cross-section, the constructional details of an auxiliary fuel governor unit suitable for use in the system shown in Figure 1.

Referring now to Figure 1, the gas turbine engine comprises an axial flow compressor 1 which delivers compressed air to a combustion chamber 2 into which fuel is injected through an atomiser 3 and ignited. The resultant combustion gases are delivered to and drive an axial flow turbine 4 which drives the compressor 1 through a shaft 5. A shaft 6 coupled to the compressor/turbine system drives a variable pitch propeller 7 through a speed reduction gearing 8. A constant speed unit 9, of known construction, incorporating a centrifugal governor, is associated with the propeller and is arranged to control the pitch thereof according to the speed or datum setting of the centrifugal governor. The unit 9 is driven by the engine through a drive 10, and controls the supply of hydraulic fluid to a pitch change motor in the hub of the propeller which motor is actuable under the control of the unit 9 to adjust the pitch of the propeller. As is very well known in the art the unit 9 acts to maintain the speed of the propeller at the speed determined by the datum setting of the centrifugal governor of the unit, by causing adjustments in the pitch of the propeller. To this end the centrifugal governor is arranged to control an hydraulic control valve in the fluid pressure lines 180 going to the pitch change motor. When the propeller overspeeds the centrifugal governor displaces the valve from an equilibrium position to supply hydraulic fluid under pressure to the pitch change motor to actuate the motor in the sense to coarsen the pitch of the propeller, and when the propeller underspeeds the centrifugal governor displaces the valve from its equilibrium position to supply hydraulic fluid under pressure to the pitch change motor to actuate the motor in the sense to fine the pitch of the propeller. When the propeller is in an onspeed condition the centrifugal governor holds the valve in its equilibrium position in which the pitch change motor remains inoperative.

A fuel control 11 controls the amount of fuel delivered to the atomiser 3 from a fuel tank and pump (not shown). The fuel control unit 11 may be as described in British patent specification No. 582,961.

The constant speed unit 9 and the fuel control unit 11 are operated from the master control unit 14, and these three units together comprise, broadly speaking, a known form of control system of the kind hereinbefore described.

The control system in accordance with the invention which is now being described further comprises an auxiliary fuel governor generally indicated at 25 which is adapted to impose upon the system the improved control characteristics to which reference has been made above.

A pilot's master control lever 12 is connected to an input lever 13 of the master control unit 14 which has two output shafts 15 and 16.

A change in the setting of the lever 12 produces a corresponding change in the setting of the lever 13. Movement of the lever 13 causes rotation of an input shaft 110 of the master control unit and the input shaft drives through suitable gearing the output shafts 15 and 16. The gearing may comprise speed control and fuel control cams as described for example in the specification of U.S. patent application Serial No. 358,863 filed June 1, 1953, now Pat. No. 2,781,856 in the names of Ellis Danvers and Henry Twitchen assignors to Rotol Limited, a British company, the assignee in the present case. In Serial Number 358,863 lever 90 corresponds to lever 13 of the present case, lever 158 and 159 correspond to shaft 15 of the present case, and lever 149 and rod 101 correspond to shaft 16 of the present case. Rotation of the output shaft 15 adjusts the fuel control unit 11, and therefore the power output of the engine, in a manner hereinafter described, while rotation of the output shaft 16 adjusts the datum setting of the centrifugal governor of the constant speed unit and therefore the speed of the engine and propeller in the manner later described, and it is to be understood that the gearing between the input shaft 110 and the output shafts 15 and 16 is such as to give the required relation between power output and speed for all positions of the lever 12.

To the first shaft 15 is connected a lever 17 having an eccentric extension or pivot 18 upon which is pivoted between its arms 101, 102 a double armed lever 19 which in the example being described is in the form of an H sectioned member. To the arm 101 of member 19, a link 20 is pivoted at 20a, and the link 20 is pivoted at a different point 20b to a control lever 21 of the fuel control 11. The double armed lever 19, the pivot 18 and the lever 17 form a differential device having two input members constituted by the lever 17 and the arm 102 of the lever 19 and an output member constituted by the arm 101 of the lever 19.

The lever 21 is carried by a fuel control shaft 100 rotation of which adjusts the fuel flow to the atomiser 3 in any well known or convenient manner. To the arm 102 of member 19 a link 22 is pivoted at 22a about an axis which is co-incident with the axis of the shaft 15 when the centrifugal fuel governor, later described, is in its equilibrium setting, and at another point 22b the link 22 is pivoted to an output lever 23 of the auxiliary fuel governor unit 25, this lever being carried by an output shaft 103 of the unit.

On the second output shaft 16 of the master control unit 14 are mounted two levers 26 and 27. Lever 26 is pivotally connected by a rod 28 to a control lever 29 of the constant speed unit 9, while lever 27 is pivotally connected by a rod 30 to a control lever 31 of the auxiliary fuel governor unit 25. Movement of the lever 29 adjusts the datum setting of the centrifugal governor of the unit 9 in well known manner, that is to say by loading or unloading the speeder spring of the centrifugal governor and movement of the lever 31 adjusts the datum setting of the centrifugal governor of the auxiliary fuel governor in a corresponding manner later described, and since the levers 29 and 31 are adjusted by rotation of a common shaft, i.e. shaft 16, the datum settings of the two centrifugal governors are adjusted in unison.

Referring now to Figure 2, the auxiliary fuel governor comprises a casing 25 (which as shown is, for convenience in driving, on an extension of a tachometer generator supporting casing 32) the upper part of which is provided with apertures 33 and 34 providing inlets for hydraulic fluid under pressure. A bore 24 is provided in the casing 25, this bore having three diameters 35, 36 and 37. The casing 25 is mounted on a gear casing 38 projecting from the tachometer generator supporting casing 32. The uppermost diameter 35 of bore 24, accommodates a hollow stem 39 which constitutes the piston rod of a servo piston 40, which is reciprocable within a cylinder constituted by the largest diameter 36 of bore 24 the piston and cylinder forming a double acting hydraulic servo motor. The stem 39 is provided with a gear rack 41 which co-operates with a gear pinion 42 carried by the output shaft 103. The servo piston 40 is provided with passages 43 and 44 which respectively place ports 106 and 107 in the opposite faces of the piston in communication with ports 45 and 46 opening into the bore 47 of the stem 39. Slidable within the bore 47 is a hollow valve member 48 which is provided with lands 49, 50, 51 and 52 and ports 53, 54, 55, 56, 57, 58, 59 and channel 60 at its extreme lower end. Ports 61 near the upper end of piston rod 39 register with the inlet apertures 33 and 34. Within the upper part of the hollow valve member 48 is housed a hollow liner 62 provided with lands 63, 64 and 65 and ports 66 and 67 which register with ports 54 and 55 in the member 48. The liner 62 is held in fixed relation to the member 48 by a taper pin 68.

The inclusion of the liner 62 provides two distinct passages 111 and 112 within the valve member 48. The passage 111 is an annular passage and is formed between the outer surface of the liner and the inner surface of the member 48, the passage being bounded at its ends by the lands 63 and 65. The passage 111 places the ports 53 in communication with the ports 56. The passage 112 is constituted by the bore of the liner 62, and this passage is placed in communication with the ports 54 and 55 in the valve member 48 through ports 66 and 67 in land 64 of the liner. The lower end of the passage 112 opens to the interior of the valve member 48 as at 113 and the passage 112 consequently also communicates with ports 57, 58 and 59 in the valve member.

The third diameter 37 of bore 24, which is smaller than diameter 36 but larger than diameter 35, accommodates a tubular sleeve 69 which is provided with a gear rack 70 which co-operates with a pinion 71 mounted on a shaft 108 (see Figure 1) which carries the lever 31. The tubular sleeve 69 is reciprocable (in either direction from the position shown in the drawings) to load or unload a coil spring 72 which seats at one end on a shoulder 73 within the bore of the tubular sleeve, and at its other end upon a bearing sleeve 74 which is mounted on the outer race of a ball bearing 75. The bearing inner race is mounted on a spigot near the lower end of the member 48. Secured to the extreme end of the member 48 by means of a taper pin 76 is a cylindrical member having a flange 77 which on its upper face is, under the effect of the coil spring 72, borne against by the bearing inner race. The lower face of the flange 77 bears against the inner ends of flyweights 78 and 79 which are mounted on pivots 80 and 81, which in turn are mounted on a rotatable cup 82 provided with a ring gear 83 and drain apertures 84. The lower face of the flange 77 bears frictionally against the inner ends of the flyweights 78, 79 so that the flange 77 rotates with the flyweights and therefore with the cup 82. The valve member 48 is therefore also rotatable with cup 82 and at the same time is reciprocable under the action of the governor flyweights 78 and 79 and the spring 72.

The ring gear 83 is driven from the engine in any convenient manner so that the speed of rotation of the gear 83 is in fixed relation with the engine speed. In the particular example now being described gear 83 meshes with gear wheel 87 which meshes with a third gear 88 which is splined to the tachometer drive shaft 89 from the engine.

When the lever 31 is moved the tubular sleeve 69 slides in the diameter 37 of the bore 24 and adjusts the loading in the spring 72. The loading in the spring 72 determines the engine speed at which the flyweights 78 and 79 assume a particular setting referred to as the equilibrium setting, and the unit 25 is designed and controlled by the lever 31 so that when the engine speed corresponds with the speed selected by the lever 12, the flyweights 78 and 79 take up their equilibrium setting. Similarly, for each setting of the lever 12 the centrifugal governor of the constant speed unit 9 also assumes a particular "equilibrium setting" at the engine speed corresponding to the setting of the lever 12.

The operation of the arrangement will now be described.

Referring to Figure 1, let it be assumed that the gas turbine is running at "approach idling" speed (i.e. at a relatively low speed which is suitable for an aircraft approaching an aerodrome or aircraft carrier prior to landing). To increase the power output, if the pilot decides to continue flying, his master control lever 12 must be moved, for example to the "maximum cruise" position, calling for increases in engine speed, propeller pitch and fuel supply. Suppose that the lever 12 is moved rapidly to this position. Consequently the input lever 13 of the master control unit 14 moves to a corresponding position. The master control unit resets the output shafts 15 and 16 to their respective correlated new positions i.e. the fuel control unit 11 and the constant speed unit 9 are reset to call for adjustment towards the new fuel flow and engine and propeller speed demanded by the master control unit. The output shaft 15 displaces lever 17 which results in pivotal movement of the member 19 about pivot 22a. This movement is transmitted via pivot 20a, rod 20 and pivot 20b to adjust the setting of the control lever 21 of the fuel control 11. At the same time the second output shaft 16 of the master control unit 14 adjusts the angular position of levers 26 and 27 which respectively reset the control lever 29 of the constant speed unit 9 through rod 28, and the control lever 31 of the auxiliary fuel governor unit 25 through rod 30. Both the constant speed unit 9 and auxiliary fuel governor unit 25 are driven from the engine through drives 10 and 89 respectively, and the equilibrium settings of their respective governor flyweights correspond as previously explained.

Due to the fact that pitch coarsening of the propeller is a relatively slower process than acceleration of the engine under the increased supply of fuel, the engine will accelerate rapidly while the master control lever is being moved, and will reach its new maximum cruise speed at about the same time, or very little later than that at which the movement of the lever 12 stops. Assuming first, for simplicity, that the engine speed has reached its required new value at the same moment that movement of the lever 12 ceases, it will be appreciated that the pitch of the propeller will be below that necessary to absorb the full power of the engine at that speed and fuel supply rate and that a further rise in speed must occur for the control valve of the constant speed unit to open in the sense to coarsen the pitch by the necessary amount. The auxiliary fuel governor acts in the following manner to reduce the rise in speed which thus takes place.

Since during adjustment of the lever 12 engine speed has kept pace with such adjustment the output lever 23 of the auxiliary fuel governor 25 does not move during this stage of the operation since there is a trapped volume of oil on each side of the servo piston 40, no movement of the valve member 48 from its equilibrium position having taken place. As soon as the engine speed exceeds that called for by the new datum setting the flyweights 78, 79 move outwardly about their pivots 80, 81, overcoming the pressure of the coil spring 72 and moving the piston valve 48 upwardly. Consequently the lands 51 and 52 open the ports 45 and 46 so that fluid entering apertures 33, 34 and passing through ports 53, passage 111 and ports 56, enters port 46 and passes through passage 44 to port 107 and thence to the underside of servo piston 40. Fluid on the upperside of the servo piston as it moves upwardly is free to exhaust through port 106, passage 43, port 45 and an annular passage 115 formed between the outer surface of the valve member 48 and the bore 47 bounded at its upper end by land 52 from which it passes to the lower part of the unit 25 and thence via ports 84 in the cup member 82 to drain. The upward movement of the servo piston 40 continues until land 51 again shuts off port 46 and this upward movement of the servo piston 40 and its associated piston rod 39, which incorporates the rack 41 co-operating with the pinion 42, causes a corresponding angular displacement of the output lever 23.

Referring now to Figure 1, the lever 23 and rod 22 move member 19 about the pivot 18 (lever 17 now being fixed). Transmitted through rod 20 to the control lever 21 of the fuel control 11, this movement adjusts the fuel control setting, and the linkage arrangement is such that this adjustment is in the sense to reduce the fuel flow to the engine. This reduces the acceleration of the engine so that an initial balance between engine power and propeller power absorption occurs at a lower overspeed.

As an example, on a particular gas turbine which was subject to adjustment of the master control to speed surges of 600 to 800 r.p.m. about the set value, use of a system according to the present invention reduced the surge to only some 200 r.p.m.

It will be appreciated that the adjustment effected by movement of the lever 23 is of a temporary nature only, because as soon as the engine speed is reduced to that called for by the new setting of the master control, due in part to the coarsening of the propeller pitch and in part to the reduction in fuel supply, the flyweights will move back to their equilibrium setting, and the piston 40 will follow up the valve member 48 and move the lever 23 back by the same amount as it was previously adjusted. If the propeller pitch has not reached its new position when the flyweights 78, 79 move back to the equilibrium setting, the engine will again commence to overspeed, and the auxiliary fuel governor will repeat the sequence of control movements described, these effecting smaller and smaller temporary adjustments of the fuel flow in the sense to reduce the fuel flow, until finally the engine and propeller will settle down to the new speed and pitch respectively and the flyweights 78 and 79 will again become stabilised in their equilibrium setting.

If the propeller pitch reaches its new position before the fuel adjustment is finally completed there will also be a tendency for the speed to undershoot. This tendency is however reduced by the action of the auxiliary fuel governor in the following manner. Referring again to Figure 2, the governor flyweights, on sensing the initial undershooting move inwardly about their pivots whereupon the piston valve 48 moves downwardly under the pressure of coil spring 72 which overcomes the flyweights. Consequently the lands 51 and 52 crack open the ports 45 and 46 so that pressure fluid enters port 45 from ports 56 and passes through passage 43 to port 106 and thence to the upperside of servo piston 40. This results in the downward movement of the piston 40 and its stem 39 to close the ports 45 and 46, fluid on the underside of the piston exhausting via port 107, passage 44, port 46, an annular passage 116 formed between the outer surface of the valve member 48 and the bore 47, the passage being bounded at its ends by lands 50 and 51, ports 54, 55, 66 and 67, passage 112, ports 57, 58, 59 and channel 60 to drain.

The downward movement of the piston rod 39 causes angular adjustment of the output lever 23 which effects a slight increase in the angle of the fuel control lever 21, to increase the fuel supply and thereby reduce the undershoot. Conversely when the engine speed and power is reduced from one setting to another the auxiliary fuel governor operates in the opposite sense.

The magnitude of the adjustments effected by the auxiliary fuel governor is set to an optimum value to suit the particular propeller and engine installation for example by calibration of the governor itself and/or by suitable selection of the length of the lever arms 19 and 23. In general it has been found that the maximum adjustment required is such as to bring about changes in the fuel supply to the engine within the range of ±10%. This figure is quoted as an example only however, and it is to be understood that the magnitude of the adjustments to give the optimum efficiency particular propeller and engine installation must be determined by experiment.

The sequence of operations described depend on the control lever 12 being moved rapidly to its increased or reduced power output setting in which case alteration of fuel flow, and therefore engine speed, takes place more rapidly than alteration of propeller pitch as already explained. In these circumstances it will be noted from the foregoing description that when pitch change lags behind alteration in fuel flow the auxiliary fuel governor comes into operation and the pivot 22a moves away from its position as shown in Figure 1 in which it is coincident with the axis of the shaft 15. The position of the pivot 22a in relation to the shaft 15 as shown in Figure 1 corresponds to the "on speed" equilibrium position i.e. when the flyweights 78 and 79 are in their equilibrium setting. Should the control lever 12 be moved so slowly that adjustment of the fuel flow and propeller pitch keep in step, the pivot 22a would not move away from its position in relation to the shaft 15 as shown in Figure 1 and the auxiliary fuel governor would not operate. So far the operation of the arrangement has only been described under the conditions where both engine speed and power are increased or reduced. The arrangement is however operable when the engine is required to run at a constant speed, and any power change is absorbed by corresponding propeller pitch change only. For example supposing the master control unit 14 calls for a constant engine speed through a certain range of fuel flows this being achieved by suitably designing the profile of a speed control cam of the unit. Under these conditions, when it is required to increase the power output of the engine, adjustment of the throttle lever 12 will be transmitted to the control lever 21 of the fuel control 11 via the master control unit 14, but there will be no adjustment of the control lever 29 of the constant speed unit 9, or the control lever 31 of the auxiliary fuel governor 25. As a result the engine speed will tend to rise, and thus the centrifugal flyweights both in the constant speed unit and the auxiliary fuel governor will move outwardly about their pivots causing displacement of their associated control valves.

The constant speed unit will therefore initiate adjustment of the propeller pitch changing motor to coarsen the propeller pitch and absorb the increased power while maintaining the engine speed as near to its setting as possible. However the pitch change adjustment is not normally sufficiently fast enough to prevent significant over speeding of the engine and over speeding is reduced by the auxiliary fuel governor as will now be explained.

The movement of the control valve of the auxiliary fuel governor results in a small adjustment of the output lever 23 which is transmitted to the control lever 21 of the fuel control 11 temporarily to reduce the fuel flow setting. This temporary adjustment gives rise to a delay in the time taken for the engine to achieve its increased power output and therefore enables the pitch change of the propeller more nearly to keep in step with the increase of power and thus the overspeed of the engine is reduced during the power output adjustment.

When the throttle lever 12 is moved to reduce the power output under conditions where the engine speed is to be maintained constant the auxiliary fuel governor acts in the converse manner to prevent undesirable underspeeding of the engine.

As an example of the magnitude of the adjustments made by the auxiliary fuel governor and their effect, in the circumstances just described, it has been found that with a particular propeller engine installation in which the engine speed was required to remain constant at 7800 r.p.m., any change in power output being accounted for by change in propeller pitch, the average overshoot/undershoot on rapid change of throttle setting without an auxiliary fuel governor was to the order of ±600 r.p.m., while, with an auxiliary fuel governor operating as described, and effecting a temporary adjustment resulting in a change in fuel supply within the range ±8% the overshoot/undershoot was only to the order of ±250 r.p.m.

It will also be appreciated that the auxiliary fuel governor will assist the constant speed unit in maintaining the speed constant when an influence other than adjustment of the master control lever 12 tends to disturb the speed. Thus, for example, if an air-craft in level flight with the lever 12 in a fixed position is put into a dive, the engine would normally overspeed until pitch coarsening of the propeller brings the speed back to the selected value. In such a case the auxiliary fuel governor would act to reduce the fuel supply during the overspeed period and thus reduce the amount of such overspeeding.

We claim:

1. For an internal combustion engine driven propeller unit comprising a single master control; a variable datum speed governor operable to adjust the pitch of the propeller and to maintain the speed of the propeller constant at the datum setting of the speed governor, said master control being operatively connected to said governor to adjust the datum setting thereof; a control member connected to the master control for movement thereby when the master control moves; a fuel control for controlling the rate of flow of fuel to the engine of the unit, said fuel control being operatively connected to said control member: the combination of an auxiliary fuel governor unit comprising a variable datum centrifugal fuel governor which is responsive to engine speed and which has its datum setting adjustable in unison with the datum setting of said speed governor so that when the engine speed corresponds to any particular speed selected by said master control, said fuel governor and said speed governor are always in equilibrium setting, an output shaft rotatable under control of said fuel governor, an output lever carried by said output shaft, and a fuel governor link pivoted to said lever at a position spaced from said output shaft; a fuel control lever connected to control said fuel control; a fuel control link pivoted to said fuel control lever to move the latter; and a double armed link pivotally connected at one arm to said fuel governor link, at the other arm to said fuel control link and between its arms to said control member.

2. The combination of claim 1 in which the control member is in the form of a control shaft carrying a pivot on which said double armed lever is mounted, the axis of the pivot being spaced from the axis of the control shaft by the same distance as it is spaced from the axis of the double armed lever about which the fuel governor link pivots, said fuel governor unit being arranged so that when the fuel governor is in its equilibrium position, the axis of the control shaft and said axis of the double armed lever are coincident.

3. For an internal combustion engine driven propeller unit comprising a single master control; a variable datum speed governor operable to adjust the pitch of the propeller and to maintain the speed of the propeller constant at the datum setting of the speed governor, said master control being operatively connected to said governor to adjust the datum setting thereof; a control member connected to the master control for movement thereby when the master control moves; a fuel control for controlling the rate of flow of fuel to the engine of the unit, said fuel control being operatively connected to said control member: the combination of an auxiliary fuel governor unit comprising a variable datum centrifugal fuel governor which is responsive to engine speed and which has its datum setting adjustable in unison with the datum setting of said speed governor so that when the engine speed corresponds to any particular speed selected by said master control, said fuel governor and said speed governor are always in equilibrium setting, a double acting hydraulic piston and cylinder servo motor, a pair of ports communicating with said cylinder one on either side of said piston, a source of hydraulic fluid under pressure, a drain, a valve operatively connected to the fuel governor to be in its equilibrium position when said fuel governor is in its equilibrium position and to be moved therefrom when said fuel governor moves from its equilibrium position in the direction of movement of said fuel governor, said valve shutting off both said ports when in said equilibrium position, connecting one port to said source and the other port to drain when moved from its equilibrium position in one direction and said other port to source and said one port to drain when moved from its equilibrium position in the opposite direction, whereby said piston is respectively fixed relatively to said cylinder, moved in said one direction and moved in said opposite direction, an output shaft operatively connected to said servo motor to be rotated thereby on relative movement of said piston and cylinder, an output lever carried by said output shaft, and a fuel governor link pivoted to said lever at a position spaced from said output shaft; a fuel control lever connected to control said fuel control; a fuel control link pivoted to said fuel control lever to move the latter; and a double armed link pivotally connected at one arm to said fuel governor link, at the other arm to said fuel control link and between its arms to said control member.

4. For an internal combustion engine driven propeller unit comprising a single master control; a variable datum speed governor operable to adjust the pitch of the propeller and to maintain the speed of the propeller constant at the datum setting of the speed governor, said master control being operatively connected to said governor to adjust the datum setting thereof; a control member connected to the master control for movement thereby when the master control moves; a fuel control for controlling the rate of flow of fuel to the engine of the unit, said fuel control being operatively connected to said control member; the combination of an auxiliary fuel governor unit comprising a variable datum centrifugal fuel governor which is responsive to engine speed and which has its datum setting adjustable in unison with the datum setting of said speed governor so that when the engine speed corresponds to any particular speed selected by said master control, said fuel governor and said speed governor are always in equilibrium setting, a hydraulic double acting piston and cylinder servo motor, a source of hydraulic fluid under pressure, a drain, a hollow piston rod on which the piston is mounted, a first conduit leading from the interior of said hollow piston rod to one side of the piston to communicate with the cylinder on said one side of the piston, a second conduit leading from the interior of said hollow piston rod to the other side of the piston to communicate with the cylinder on said one side of piston, a valve member within the hollow piston rod and operatively connected to said fuel governor for movement therewith, a pair of lands on said valve member located to shut off both conduits when the fuel governor is in its equilibrium position and to connect one of said conduits to said source and the other to drain and vice versa when said fuel governor is moved from its equilibrium position respectively in one direction or the other whereby said piston is respectively fixed relative to said cylinder, moved in one direction and moved in the other direction relative to said cylinder, an output shaft operatively connected to said servo motor to be rotated thereby on relative movement of said piston and cylinder, an output lever carried by said output shaft, and a fuel governor link pivoted to said lever at a position spaced from said output shaft; a fuel control lever connected to control said fuel control; a fuel control link pivoted to said fuel control lever to move the latter; and a double armed link pivotally connected at one arm to said fuel governor link, at the other arm to said fuel control link and between its arms to said control member.

5. For an internal combustion engine driven propeller unit comprising a single master control; a variable datum speed governor operable to adjust the pitch of the propeller and to maintain the speed of the propeller constant at the datum setting of the speed governor, said master control being operatively connected to said governor to adjust the datum setting thereof; a control member connected to the master control for movement thereby when the master control moves; a fuel control for controlling the rate of flow of fuel to the engine of the unit, said fuel control being operatively connected to said control member: the combination of an auxiliary fuel governor unit comprising a variable datum centrifugal fuel governor which is responsive to engine speed and which has its datum setting adjustable in unison with the datum setting of said speed governor so that when the engine speed corresponds to any particular speed selected by said master control, said fuel governor and said speed governor are always in equilibrium setting, a hydraulic double acting piston and cylinder servo motor, a source of hydraulic fluid under pressure, a drain, a hollow piston rod on which the piston is mounted, a first conduit leading from the interior of said hollow piston rod to one side of the piston to communicate with the cylinder on said one side of the piston, a second conduit leading from the interior of said hollow piston rod to the other side of the piston to communicate with the cylinder on said one side of the piston, said first and second conduits opening into the interior of the hollow piston at locations spaced axially from one another, a valve member within the hollow piston rod and operatively connected to said fuel governor for movement therewith, said valve member having an interior passage communicating with said source, a pair of spaced lands which when the fuel governor is in its equilibrium position each shut off a port, an opening leading from said interior passage to the space between said lands, said valve member being moved when said fuel governor moves in one direction from its equilibrium position to place said space in communication with one conduit and to connect the other conduit to drain and when said fuel governor moves in the opposite direction to place said space in communication with said other conduit and connects said one conduit to drain, an output shaft operatively connected to said servo motor to be rotated thereby on relative movement of said piston and cylinder, an output lever carried by said output shaft, and a fuel governor link pivoted to said lever at a position spaced from said output shaft; a fuel control lever connected to control said fuel control; a fuel control link pivoted to said fuel control lever to move the latter; and a double armed link pivotally connected at one arm to said fuel governor link, at the other arm to said fuel control link and between its arms to said control member.

6. For an internal combustion engine driven propeller unit comprising a single master control; a variable datum speed governor operable to adjust the pitch of the propeller and to maintain the speed of the propeller constant at the datum setting of the speed governor, said master control being operatively connected to said governor to adjust the datum setting thereof; a control member connected to the master control for movement thereby when the master control moves; a fuel control for controlling the rate of flow of fuel to the engine of the unit, said fuel control being operatively connected to said control member: the combination of an auxiliary fuel governor unit comprising a variable datum centrifugal fuel governor which is responsive to engine speed and which has its datum setting adjustable in unison with the datum setting of said speed governor so that when the engine speed corresponds to any particular speed selected by said master control, said fuel governor and said speed governor are always in equilibrium setting, a hydraulic double acting piston and cylinder servo motor, a source of hydraulic fluid under pressure, a drain, a hollow piston rod on which the piston is mounted, a first conduit leading from the interior of said hollow piston rod to one side of the piston to communicate with the cylinder on said one side of the piston, a second conduit leading from the interior of said hollow piston rod to the other side of the piston to communicate with the cylinder on said one side of the piston, said first and second conduits opening into the interior of the hollow piston at locations spaced axially from one another, a valve member within the hollow piston rod and operatively connected to said fuel governor for movement therewith, said valve member having an interior passage communicating with said source, a pair of spaced lands which when the fuel governor is in its equilibrium position each shut off a port, an opening leading from said interior passage to the space between said lands, an outer passage formed between said valve member and said stem, which passage communicates with said drain, said valve member being moved when said fuel governor moves from its equilibrium position in one direction to place one passage in communication with said space and the other passage in communication with the outer passage and when the fuel governor moves from its equilibrium position in the other direction to place said other passage in communication with said space and said one passage in communication with said outer passage, an output shaft operatively connected to said servo motor to be rotated thereby on relative movement of said piston and cylinder, an output lever carried by said output shaft, and a fuel governor link pivoted to said lever at a position spaced from said output shaft; a fuel control lever connected to control said fuel control; a fuel control link pivoted to said fuel control lever to move the latter; and a double armed link pivotally connected at one arm to said fuel governor link, at the other arm to said fuel control link and between its arms to said control member.

References Cited in the file of this patent
UNITED STATES PATENTS

| | | |
|---|---|---|
| 2,552,131 | Adams | May 8, 1951 |
| 2,574,335 | Leduc | Nov. 6, 1951 |
| 2,593,536 | Chamberlin | Apr. 22, 1952 |
| 2,599,899 | Denton | June 10, 1952 |
| 2,759,549 | Best | Aug. 21, 1956 |
| 2,779,422 | Dolza et al. | Jan. 29, 1957 |